United States Patent Office 3,551,409
Patented Dec. 29, 1970

3,551,409
ADENOSINE DERIVATIVES
Wolfgang Kampe, Heddesheim, Max Thiel, Mannheim, and Kurt Stach, Wolfgang Schaumann, and Karl Dietmann, Mannheim - Waldhof, Germany, assignors to Boehringer Mannheim Gesellschaft mit beschrankter Haftung, a corporation of Germany
No Drawing. Filed Dec. 18, 1967, Ser. No. 691,124
Claims priority, application Germany, Dec. 21, 1966, B 90,400
Int. Cl. C07d 51/54
U.S. Cl. 260—211.5
9 Claims ABSTRACT OF THE DISCLOSURE
Novel adenosine derivatives of the formula:

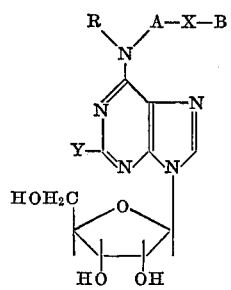

wherein Y is halogen or hydroxyl, R is hydrogen or lower alkyl, A is saturated or unsaturated, straight, branched chain or cyclic, substituted or unsubstituted aliphatic hydrocarbyl, wherein said substituent is hydroxyl or acyloxy, X is a valency bond, oxygen, sulfur, imino, alkylated imino or acylated imino, and B is hydrogen, substituted or unsubstituted phenyl or naphthyl wherein said substituent is halogen, hydroxyl, alkyl, haloalkyl, alkoxy, aryloxy, acyloxy or alkylmercapto.

The above adenosine derivatives are possessed of hemodynamic and coronary dynamic activity. They are particularly important because of their ability to at least partially reverse the hemodynamic abnormalities of congestive heart failure and other low cardiac-output states.

---

This invention relates to derivatives of adenosine, to compositions containing such adenosine derivatives and to methods of preparing and using such derivative compositions.

More particularly the invention relates to derivatives of adenosine having the formula:

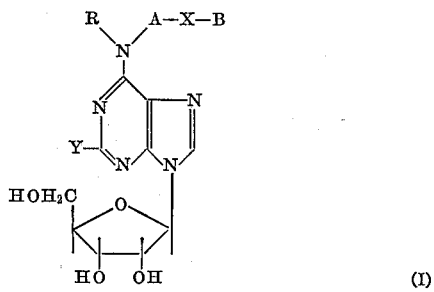

wherein Y is halogen or hydroxyl, R is hydrogen of lower alkyl, A is saturated or unsaturated, straight-chain, branched or cyclic, unsubstituted aliphatic hydrocarbyl wherein said substituent is hydroxyl or acyloxy, X is a valency bond, oxygen, sulfur, imino, alkylated imino or acylated imino and B is hydrogen, substituted or unsubstituted phenyl or naphthyl, wherein said substituent is halogen, hydroxyl, alkyl, haloalkyl, alkoxy, aryloxy, acyloxy or alkylmercapto.

The adenosine derivatives according to the present invention are possessed of hemodynamic and coronary dynamic activity.

The adenosine derivatives of the invention stimulate the coronary and peripheral vasculatures and in addition have direct cardiac effects which augment heart rate and increase cardiac output. The adenosine derivatives of the invention are effective to at least partially reverse the hemodynamic abnormalities of congestive heart failure and other low cardiac-output states.

The novel adenosine derivatives according to the present invention can be prepared, for example, by reacting a purine riboside having the formula:

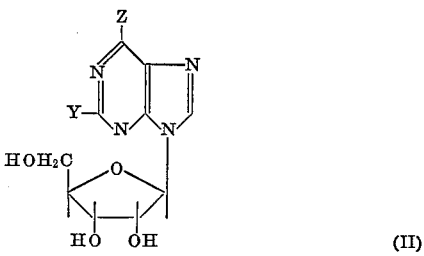

wherein Y has the same meaning as given above and Z is halogen or a reactive mercapto group with an amine having the formula:

$$R—HN—A—X—B \qquad (III)$$

wherein A, B, R and X have the same meanings as given above, wherein the hydroxyl groups in the ribose residue may be temporarily blocked by protective groups which can be readily split off after the condensation reaction has taken place.

In the case where it is desired to prepare compounds having the above set out Formula I where Y is hydroxyl, an adenosine derivative of the formula:

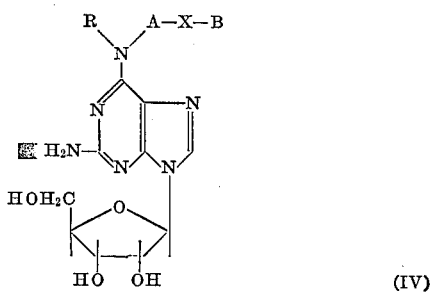

wherein A, B, R and X are as defined above, is first diazotized and thereafter hydrolyzed.

As starting materials corresponding to Formula II, it is preferred to use purine ribosides in which Y and Z represent chlorine or bromine, such as are described, for example, in J. Heterocyclic Chem., 1, 213/1964 and in J. Org. Chem., 31, 3262/1966. However, there can also be used, for example, compounds of the Formula II in which Y is hydroxyl and Z is methylmercapto or benzylmercapto. These compounds can be prepared, for example, by the diazotization and subsequent hydrolysis of the thioguanosine derivatives described in Chem. Pharm. Bull., 12, 951/1964.

The adenosine derivatives of Formula IV used as starting materials can be prepared by the reaction of an amine having the Formula III with a purine-riboside of the Formula II in which Y is an amino group, using substantially the same reaction conditions as for the above-described reaction.

In carrying out the preparation of the adenosine derivatives according to the present invention, the reaction components are advantageously heated in a suitable inert, solvent, and preferably in a comparatively high boiling alcohol or ether, as for example, n-propanol, isopropanol, butanol, tetrahydrofuran or dioxan, possibly in the presence of an equimolar amount of a tertiary amine, preferably triethylamine. Alternatively, the reaction components can be left to stand for several days at ambient temperature.

In those cases in which it is desired temporarily to block the hydroxyl groups in the compounds having the Formula II there are used the protective groups which are usual in sugar chemistry. Thus, for example, there can be used acyl groups and preferably acetyl or benzoyl, or there can be used ketals, such as the 2′,3′-isopropylidene compounds, which, following the condensation reaction, can easily be converted into the free 2′,3′-dihydroxy compounds with the use of acids. When acyl radicals are used as protective groups, these are, however, split off by the use of alkali.

The following examples are given for the purpose of illustrating the present invention and are in nowise to be construed in limitation thereof.

EXAMPLE 1

N(6)-(D-1-phenyl-propyl-2)-2-chloroadenosine 4.5 g. triacetyl - 2,6 - dichloro-9-($\beta$-D-ribofuranosyl)-purine, 2.03 g. D-1-phenyl-2-aminopropane and 2.02 g. triethylamine were boiled under reflux for 2 hours in 50 ml. isopropanol. The resulting reaction mixture was then evaporated in a vacuum, the residue taken up in ether and water and the ethereal phase then washed twice with water, dried and evaporated. The residue was thereafter mixed with 40 ml. methanol which had been saturated with ammonia. Following standing overnight at ambient temperature, the reaction mixture was treated with activated charcoal, filtered and evaporated. The residue was dissolved in ethyl acetate and ligroin was added dropwise, while stirring. The precipitate which was obtained was filtered off with suction, washed with ligroin and dried. There were thusly obtained 2.0 g. (47% of theory) N(6)-(D - 1-phenyl-propyl-2)-2-chloroadenosine, which had a melting point of 65° C. (decomp.).

EXAMPLE 2

N(6)-(D,L-1-phenyl-propyl-2)-2-chloroadenosine

Using a method analogous to that described in Example 1, there were obtained from 4.5 g. triacetyl-2,6-dichloro-9 - ($\beta$-D-ribofuranosyl)-purine, 2.03 g. D,L-1-phenyl-2-aminopropane and 2.02 g. triethylamine, a crude product which was then purified by preparative chromatography on silica gel plates with chloroform/methanol (6:1). There were recovered 2.8 g. (66% of theory) N(6)-(D,L - 1 - phenyl-propyl-2)-2-chloroadenosine, which had a melting point of 64–66° C.

EXAMPLE 3

N(6)-(p-chlorobenzyl)-2-chloroadenosine 4.5 g. triacetyl - 2,6 - dichloro-9-($\beta$-D-ribofuranosyl)-purine, 2.0 g. p-chlorobenzylamine and 2.02 g. triethylamine were boiled under reflux for 2 hours in 50 ml. isopropanol. The reaction mixture was then evaporated in a vacuum and the residue distributed between ether and water. The dried ethereal phase was evaporated and the residue taken up in 400 ml. methanol which had been saturated with ammonia. After standing overnight at ambient temperature, the solution was treated with activated charcoal, filtered and evaporated. The residue was dissolved in ethyl acetate and this solution added dropwise to ligroin. The initially greasy precipitate was treated several times with fresh ligroin. After standing in a refrigerator for a comparatively long period of time, there was obtained a solid substance which was filtered off with suction, washed with ligroin and dried. There were thusly obtained 3.5 g. (81% of theory) N(6)-(p-chlorobenzyl)-2-chloroadenosine, which had a melting point of 85–87° C.

EXAMPLE 4

N(6)-(o-chlorobenzyl)-2-chloroadenosine

Using a procedure analogous to that described in Example 1, 4.5 g. triacetyl - 2,6 - dichloro-9-($\beta$-D-ribofuranosyl)-purine, 2.0 g. o-chlorobenzylamine and 2.02 g. triethylamine were boiled under reflux in 50 ml. isopropanol. Following working up, there was obtained a crude product which was purified by preparation chromatography according to the method described in Example 2. There thusly was obtained 1.8 g. (42% of theory) N(6)-(o-chlorobenzyl) - 2-chloroadenosine, which had a melting point of 80–83° C.

EXAMPLE 5

N(6)-(m-chlorobenzyl)-2-chloroadenosine

In a manner analogous to that described in Example 1, there was obtained from 4.5 g. triacetyl-2,6-dichloro-9-($\beta$-D-ribofuranosyl)-purine, 2.0 g. m-chlorobenzylamine and 2.02 g. triethylamine, following working up and purification by preparative thin layer chromatography (Example 2), 1.0 g. (23% of theory) N(6)-(m-chlorobenzyl)-2-chloroadenosine, which had a melting point of 65–67° C.

EXAMPLE 6

N(6)-benzyl-2-chloroadenosine 4.5 g. triacetyl - 2,6 - dichloro-9-($\beta$-D-ribofuranosyl)-purine, 1.65 g. benzylamine and 2.02 g. triethylamine were reacted according to the procedure disclosed in Example 1. Following working up and recrystallization from benzene/ethyl acetate, there were obtained 2.0 g. (51% of theory) N(6) - benzyl-2-chlorodenosine, which had a melting point of 149–152° C.

EXAMPLE 7

N(6)-($\beta$-phenylethyl)-2-chloroadenosine 4.5 g. triacetyl-2,6-dichloro-9-($\beta$ - D - ribofuranosyl) purine, 2.0 g. $\beta$-phenylethylamine and 2.02 g. triethylamine were reacted by the method described in Example 1. After working up and purification by preparative thin layer chromatography as set out in Example 2, there were obtained 2.2 g. (54% of theory) N(6)-($\beta$-phenylethyl)-2-chloroadenosine, which had a melting point of 87–89° C. (decomp.).

EXAMPLE 8

N(6)-($\alpha$-phenylethyl)-2-chloroadenosine

Starting from 4.5 g. triacetyl-2,6-dichloro-9-($\beta$-D-ribofuranosyl)-purine, 2.0 g. $\alpha$-phenylethylamine and 2.02 g. triethylamine and proceeding analogously to Example 1, there was obtained, after working up and purification by preparative thin layer chromatography, (Example 2), 1.4 g. (34% of theory) N(6)-($\alpha$-phenylethyl)-2-chloroadenosine, which had a melting point of 102–103° C. (decomp.).

EXAMPLE 9

N(6)-(trans-2-phenyl-cyclopropyl)-2-chloroadenosine

There were recovered starting from 4.5 g. triacetyl-2,6-dichloro-9-($\beta$-D-ribofuranosyl) - purine, 2.0 g. trans-2-phenyl-cyclopropylamine and 2.02 g. triethylamine and proceeding in a manner analogous to that described in Example 1, following working up and purification by preparative thin layer chromatography, (Example 2), 1.5 g. (35% of theory) N(6)-(trans-2-phenyl-cyclopropyl)-2-chloroadenosine, which had a melting point of 118–120° C.

EXAMPLE 10

N(6)-propyl-2-chloroadenosine 4.5 g. triacetyl-2,6-dichloro-9-(β - D - ribofuranosyl) purine, and 5.9 g. n-propylamine were boiled under reflux for 2 hours in 50 ml. anhydrous dioxan. The reaction mixture was thereafter evaporated in a vacuum and the residue mixed with 40 ml. methanol which had been saturated with ammonia. After standing overnight, the reaction mixture was evaporated in a vacuum and the residue purified by preparative thin layer chromatography according to the method described in Example 2. There were thusly obtained 1.5 g. (44% of theory) N(6) - propyl-2-chloroadenosine, which had a melting point of 97–100° C. (decomp.).

EXAMPLE 11

N(6)-isobutyl-2-chloroadenosine 4.5 g. triacetyl - 2,6 - dichloro-9-(β-D-ribofuranosyl) purine and 3.7 g. isobutylamine were boiled under reflux for 2 hours with 50 ml. anhydrous dioxane. The reaction mixture was then worked up by a method analogous to that described in Example 1. The crude product which was obtained was recrystallized from a little ethyl acetate. There was recovered 0.73 g. (20% of theory) N(6)-isobutyl-2-chloroadenosine, which had a melting point of 168–170° C.

EXAMPLE 12

N(6)-methyl-2-hydroxy-adenosine

A solution of 15 g. 2-hydroxy-6-benzylmercapto-9-(β-D-ribofuranosyl)-purine in 200 ml. dioxan, which had previously been saturated with monomethylamine at 0° C. was heated in a glass autoclave for 6 hours at 60° C. The reaction mixture was thereafter evaporated in a vacuum and the residue, with the addition of activated charcoal, recrystallized from water. There were thusly obtained 5.8 g. (50% of theory) N(6)-methyl-2-hydroxy-adenosine having a melting point of 185–190° C.

The 2-hydroxy-6-benzylmercapto-9-(β - ribofuranosyl) purine used as starting material was prepared in the following manner:

An ice-cooled solution of 18 g. sodium nitrite in 140 ml. water was added with stirring and over a period of 20 minutes to an ice-cooled solution of 20 g. 2-amino-6-benzyl-mercapto-9-(β-D-ribofuranosyl) - purine in 300 ml. glacial acetic acid. The resulting reaction mixture was thereafter allowed to stand for about 1 hour at 0° C. and then overnight at ambient temperature. Thereafter the solution was evaporated in a vacuum. The residue was mixed 2–3 times with 50–100 ml. amounts of water and again evaporated in a vacuum. The concentrated solution obtained was filtered, then thoroughly washed with water, dissolved in methanol and reprecipitated by the careful addition of water. There were thusly obtained 15.2 g. (75% of theory) 2-hydroxy-6-benzyl-mercapto-9-(β-D-ribofuranosyl) - purine, which had a melting point of 137–139° C.

EXAMPLE 13

N(6)-allyl-2-hydroxy-adenosine 3.9 g. 2 - hydroxy-6-benzylmercapto-9-(β-D-ribofuranosyl)-purine and 5.7 g. allylamine were dissolved in 50 ml. anhydrous dioxan and heated in a glass autoclave for 6 hours at 50° C. The reaction mixture was then evaporated in a vacuum and the residue triturated with ethyl acetate. Following recrystallization from isopropanol, there were obtained 1.1 g. (33% of theory) N(6)allyl-2-hydroxy-adenosine, which had a melting point of 220–222° C. (decomp.).

EXAMPLE 14

N(6)-(o-chlorobenzyl)-2-hydroxy-adenosine 3.9 g. 2-hydroxy-6-benzylmercapto-9-(β - D - ribofuranosyl)-purine and 2.0 g. o-chlorobenzylamine were boiled under reflux for 4 hours in 50 ml. isopropanol. The resulting reaction mixture was then evaporated in a vacuum and the residue recrystallized twice from n-propanol. There were thusly obtained 1.0 g. (25% of theory) N(6)-(o-chlorobenzyl)-2-hydroxy-adenosine, which had a melting point of 170–172° C. (decomp.).

EXAMPLE 15

N(6)-(m-chlorobenzyl)-2-hydroxy-adenosine 3.9 g. 2-hydroxy-6-benzylmercapto-9-(β-D-ribofuranosyl)-purine and 2.0 g. m-chlorobenzylamine were heated under reflux for 5 hours in 50 ml. anhydrous dioxan. The reaction mixture was thereafter evaporated in a vacuum and the residue recrystallized from isopropanol, with the addition of activated charcoal. There were obtained 1.6 g. (39% of theory) N(6)-(m-chlorobenzyl)-2-hydroxy-adenosine, which had a melting point of 152–155° C.

EXAMPLE 16

N(6)-(p-chlorobenzyl)-2-hydroxy-adenosine 3.9 g. 2-hydroxy-6-benzylmercapto-9-(β-D-ribofuranosyl)-purine and 2.0 g. p-chlorobenzylamine were boiled under reflux for 2 hours in 50 ml. n-propanol. The precipitated material which formed was filtered off with suction and washed first with n-propanol and thereafter with ether. There were thusly obtained 3.2 g. (78% of theory) N(6) (p-chlorobenzyl)-2-hydroxy-adenosine, which had a melting point of 208–210° C. (decomp.).

EXAMPLE 17

N(6)-(p-methoxybenzyl)-2-hydroxy-adenosine

Following a procedure analogous to that described in Example 15, and starting from 3.9 g. 2-hydroxy-6-benzyl-mercapto-9-(β-D-ribofuranosyl)-purine and 2.15 g. p-methoxy-benzylamine, there were obtained 1.1 g. (27% of theory) N(6)-(p-methoxybenzyl)-2-hydroxy-adenosine, which had a melting pont of 166–168° C. (decomp.).

EXAMPLE 18

N(6)-benzyl-2-hydroxy-adenosine 3.9 g. 2-hydroxy-6-benzylmercapto-9-(β-D-ribofuranosyl)-purine and 10.7 g. benzylamine were boiled under reflux for 4 hours in 80 ml. butanol. The resulting reaction mixture was then evaporated in a vacuum and the residue washed with ether and recrystallized from isopropanol. There were recovered 1.4 g. (37% of theory) N(6)-benzyl-2-hydroxy-adenosine having a melting point of 160–162° C.

EXAMPLE 19

N(6)-(β-phenylethyl)-2-hydroxy-adenosine 3.9 g. 2-hydroxy-6-benzylmercapto-9-(β-D-ribofuranosyl)-purine and 6.0 g. β-phenyl-ethylamine were boiled under reflux for 2 hours with 50 ml. isopropanol. The reaction mixture was then evaporated in a vacuum and the residue washed with ether and recrystallized from butanol. There were thusly obtained 1.9 g. (49% of theory) N(6)-(β-phenylethyl)-2-hydroxy-adenosine, which had a melting point of 159–161° C.

EXAMPLE 20

N(6)-(trans-2-phenyl-cyclopropyl)-2-hydroxy-adenosine 3.9 g. 2-hydroxy-6-benzylmercapto-9-(β-D-ribofuranosyl)-purine and 2.7 g. trans-2-phenyl-cyclopropylamine were boiled under reflux for 4 hours in 40 ml. anhydrous dioxan. The reaction mixture was thereafter evaporated in a vacuum and the residue recrystallized from isopropanol. There were obtained 1.1 g. (27.5% of theory)

N(6) - (trans - 2-phenyl-cyclopropyl)-2-hydroxy-adenosine, having a melting point of 153–156° C. (decomp.).

EXAMPLE 21

N(6)-propyl-2-hydroxy-adenosine 3.9 g. 2-hydroxy-6-benzylmercapto-9-($\beta$-D-ribofuranosyl)-purine and 0.9 g. n-propylamine were heated under reflux for 2 hours in 40 ml. isopropanol. Following cooling of the resulting solution, a precipitate was obtained which was filtered off with suction and washed with isopropanol and ether. There were thusly obtained 2.1 g. (64% of theory) N(6)-propyl-2-hydroxy-adenosine, which had a melting pont of 235–240° C.

EXAMPLE 22

N(6)-isobutyl-2-hydroxy-adenosine 3.9 g. 2-hydroxy-6-benzylmercapto-9-($\beta$-D-ribofuranosyl)-purine and 3.7 g. isobutylamine were boiled under reflux for 2 hours in 50 ml. anhydrous dioxan. The reaction mixture was then evaporated in a vacuum and the residue recrystallized from isopropanol. There was obtained 0.9 g. (26% of theory) N(6)-isobutyl-2-hydroxy-adenosine which had a melting point of 214–216° C. (decomp.).

EXAMPLE 23

N(6)-(L-1-phenyl-propyl-2)-2-hydroxy-adenosine 3.9 g. 2-hydroxy-6-benzylmercapto-9-($\beta$-D-ribofuranosyl)-purine and 2.0 g. L-1-phenyl-2-aminopropane were boiled under reflux for 18 hours in 50 ml. propanol. The resulting reaction mixture was then evaporated in a vacuum and the residue purified by preparative thin layer chromatography according to the procedure disclosed in Example 2. The silica gel was first extracted several times with chloroform/methanol (1:1), this solution evaporated in a vacuum and the foamy residue triturated with ligroin. There were obtained 1.5 g. (38% of theory) N(6)-(L-1-phenyl-propyl-2)-2-hydroxy-adenosine, which had a melting point of 148–150° C.

EXAMPLE 24

N(6)-allyl-2-chloroadenosine

In a manner analogous to that described in Example 1, 4.5 g. triacetyl-2,6-dichloro-9-($\beta$-D-ribofuranosyl)-purine, 0.9 g. allylamine and 2.02 g. triethylamine were boiled under reflux for 2 hours in 50 ml. isopropanol. Following the working up of the reaction mixture, the almost colorless residue which was obtained was taken up in ligroin and filtered off with suction. There were thusly obtained 2.3 g. (68% of theory) N(6)-allyl-2-chloroadenosine, which had a melting point of 123–126° C.

EXAMPLE 25

N(6)-isopropyl-2-chloroadenosine

Following a procedure analogous to that described in Example 1, and starting from 4.5 g. triacetyl-2,6-dichloro-9-($\beta$-D-ribofuranosyl)-purine, 0.9 g. isopropylamine and 2.02 g. triethylamine, there was obtained a crude product. This product was purified by preparative thin layer chromatography according to the method described in Example 2. The silica gel was extracted several times with chloroform/methanol (1:1), the solution obtained evaporated in a vacuum and the solid, foam-like residue triturated with ligroin and filtered off with suction. There were thusly obtained 2.2 g. (64% of theory) N(6)-isopropyl-2-chloroadenosine, which had a melting ponit of 92–95° C. (decomp.).

EXAMPLE 26

N(6)-(L-threo-1-hydroxy-1-phenyl-propyl-2)-2-chloroadenosine

In a manner analogous to that described in Example 1, starting from 4.5 g. triacetyl-2,6-dichloro-9-($\beta$-D-ribofuranosyl)-purine, 2.3 g. L-threo-1-hydroxy-1-phenyl-2-amino-propane and 2.02 g. triethylamine, there was obtained a crude product which was recrystallized from a little methanol. There were thusly obtained 1.5 g. (34% of theory) N(6)-(L-threo-1-hydroxy-1-phenyl-propyl-2)-2-chloroadenosine, having a melting point of 97–100° C.

EXAMPLE 27

N(6)-(L-erythro-1-hydroxy-1-phenyl-propyl-2)-2-chloroadenosine

Using a procdure analogous to that described in Example 1, and starting from 4.5 g. triacetyl-2,6-dichloro-9-($\beta$-D-ribofuranosyl)-purine, 2.3 g. L-erythro-1-hydroxy-1-phenyl-2-amino-propane and 2.02 g. triethylamine, there was obtained a crude product which was then recrystallized from acetonitrile. There were recovered 3.0 g. (68% of theory) N(6)-(L-erythro-1-hydroxy-1-phenyl-propyl-2)-2-chloroadenosine, having a melting point of 130–132° C.

EXAMPLE 28

N(6)-(3-m-cresoxy-2-hydroxy-propyl)-2-chloroadenosine

There was obtained from 4.5 g. triacetyl2,6-dichloro-9-($\beta$-D-ribofuranosyl)-purine, 2.7 g. 3-m-cresoxy-2-hydroxy-propylamine and 2.02 g. triethylamine and using a method analogous to that described in Example 1, a crude product which was purified by preparative thin layer chromatography. The eluate from the silica gel was evaporated in a vacuum and the solid, foam-like residue remaining, triturated with ligroin. There were thusly obtained 2.1 g. (45% of theory) N(6)-(3-m-cresoxy-2-hydroxy-propyl)-2 - chloroadenosine having a melting point of 84–86° C.

EXAMPLE 29

N(6)-(2-phenyl-cyclopentyl)-2-chloroadenosine

From 4.5 g. triacetyl-2,6-dichloro-9-($\beta$-D-ribo-furanosyl)-purine, 2.4 g. 2-phenyl-cyclopentylamine and 2.02 g. triethylamine, there was obtained by following a method analogous to that described in Example 1, a crude product which was thereafter purified by preparative thin layer chromatography. The eluate from the silica gel was evaporated and the solid foam-like residue which was recovered triturated with ligroin. There were thusly obtained 2.3 g. (52% of theory) N(6)-(2-phenyl-cyclopentyl)-2-chloroadenosine having a melting point of 107–110° C.

EXAMPLE 30

N(6)-(2-phenyl-cyclohexyl)-2-chloroadenosine

Starting from 4.5 g. triacetyl-2,6-dichloro-9-($\beta$-D-ribofuranosyl)-purine, 2.7 g. 2-phenyl-cyclohexylamine and 2.02 g. triethylamine, and following a method analogous to that of Example 1, there was obtained a crude product which was then purified by preparative thin layer chromatography. The eluate from the silica gel was evaporated in a vacuum and the solid, foam-like residue triturated with ligroin. There were thusly obtained 1.4 g. (30% of theory N(6)-(2-phenyl-cyclohexyl)-2-chloroadenosine having a melting point of 108–111° C.

EXAMPLE 31

N(6)-(2-methoxy-benzyl)-2-chloroadenosine

In a manner analogous to that described in Example 1 and starting from 4.5 g. triacetyl-2,6-dichloro-9-($\beta$-D-ribofuranosyl)-purine, 2.1 g. 2-methoxy-benzylamine and 2.02 g. triethylamine, there was obtained a crude product which was purified by preparative thin layer chromatography. There was obtained a solid, foam-like product which was triturated with ligroin. There were recovered 1.8 g. (43% of theory) N(6)-(2-methoxy-benzyl)-2-chloroadenosine having a melting point of 106–109° C.

EXAMPLE 32

N(6)-(3,5-dimethoxy-benzyl)-2-chloroadenosine

In a manner analogous to that described in Example 1, but starting from 4.5 g. triacetyl-2-,6-dichloro-9-(β-D-ribofuranosyl)-purine, 2.5 g. 3,5-dimethoxy-benzylamine and 2.02 g. triethylamine, there was obtained a crude product which is recrystallized from methanol. There were obtained 2.0 g. (44% of theory) N(6)-(3,5-dimethoxy-benzyl)-2-chloroadenosine, which had a melting point of 187–189° C.

EXAMPLE 33

N(6)-(2-butyl)-2-chloroadenosine

Using a method analogous to that described in Example 1 and starting from 4.5 g. triacetyl-2,6-dichloro-9-(β-D-ribofuranosyl)-purine, 1.2 g. sec.-butylamine and 2.02 g. triethylamine, there was obtained a crude product which was purified by preparative thin layer chromatography. There was formed a solid, foam-like product which was triturated with ligroin yielding 1.2 g. (33% of theory) N(6)-(2-butyl)-2-chloroadenosine, which had a melting point of 102–104° C.

EXAMPLE 34

N(6)-(3-α-naphthoxy-2-hydroxy-propyl)-2-chloroadenosine

Using a procedure analogous to that described in Example 1, and starting from 4.5 g. triacetyl-2,6-dichloro-9-(β-D-ribofuransoyl)-purine, 3.3 g. 3-α-naphthoxy-2-hydroxy-propylamine and 2.02 g. triethylamine, there was obtained a crude product which was then purified by preparative thin layer chromatography. After evaporation of the eluate from the silica gel in a vacuum, there was obtained a solid, foam-like product which was triturated with ligroin. There were thusly obtained 1.7 g. (34% of theory) N(6)-(3-α-naphthoxy - 2 - hydroxy-propyl)-2-chloroadenosine, which had a melting point of 120–123° C.

EXAMPLE 35

N(6)-(L-(+)-threo-1-phenyl-1,3-dihydroxy-propyl-2)-2-chloroadenosine 4.5 g. triacetyl - 2,6-dichlor - 9(β-D-ribofuranosyl-purine, 2.5 g. L-(+)-threo-1-phenyl-1,3-dihydroxy-2-aminopropane and 2.02 g. triethylamine were reacted in the manner described in Example 1 and then worked up. The crude product which was recovered was purified by preparative thin layer chromatography. The eluate from the silica gel was evaporated in a vacuum and the residue triturated with ligroin. There were thusly obtained 2.5 g. (55% of theory) N(6)-(L(+)-threo-1-phenyl-1,3-dihydroxy - propyl-2)-2-chloroadenosine, which had a melting point of 80–82° C.

EXAMPLE 36

N(6)-(L-1-phenyl-propyl-2)-2-chloroadenosine

In a manner analogous to that described in Example 1, there was obtained from 4.5 g. triacetyl-2,6-dichloro-9-(β-D-ribofuranosyl)-purine, 2.0 g. L-1-phenyl-2-aminopropane and 2.02 g. triethylamine, a corresponding crude product which was then purified by preparative thin layer chromatography. The eluate from the silica gel was evaporated in a vacuum and the residue triturated with ligroin. There were thusly obtained 2.6 g. (62% of theory) N(6)-(L-1-phenyl-propyl-2)-2-chloroadenosine, which had a melting point of 94–96° C.

EXAMPLE 37

N(6)-(2-methyl-benzyl)-2-chloroadenosine 4.5 g. triacetyl - 2,6-dichloro - 9-(β-D-ribofuranosyl)-purine, 1.8 g. 2-methyl-benzylamine and 2.02 g. triethylamine were reacted according to the disclosure of Example 1 and then further worked up. The crude product was purified by preparative thin layer chromatography. The eluate from the silica gel was evaporated in a vacuum and the resulting residue triturated with ligroin. There were obtained 2.1 g. (52% of theory) N(6)-(2-methyl-benzyl)-2-chloroadenosine, which had a melting point of 103–105° C.

EXAMPLE 38

N(6)-(2-phenoxy-cyclopropyl)-2-chloroadenosine 4.5 g. triacetyl - 2,6-dicholor - 9-(β-D-ribofuranosyl)-purine, 2.2 g. 2-phenoxy-cyclopropylamine and 2.02 g. triethylamine were reacted according to the method described in Example 1 and then worked up. The crude product which was thereby formed was purified by preparative thin layer chromatography. The eluate from the silica gel was evaporated in a vacuum and the solid, foam-like residue was triturated with ligroin. There was obtained 1.8 g. (41% of theory) N(6)-(2-phenoxy-cyclopropyl)-2-chloroadenosine, which had a melting point of 100°–103° C.

EXAMPLE 39

N(6)-[D,L-2-hydroxy-2-(3-methoxy-phenyl)-ethyl]-2-chloroadenosine 4.5 g. triacetyl - 2,6 - dichloro-9-(β-D-ribofuranosyl)-purine, 2.5 g. D,L-2-hydroxy-2-(3-methoxy-phenyl)-ethylamine and 2.02 g. triethylamine were reacted by a procedure analogous to that described in Example 1 and thereafter worked up. The crude product was purifide by preparative thin layer chromatography. The eluate from the silica gel was evaporated in a vacuum and the solid, foam-like residue triturated with ligroin. There were obtained 1.7 g. (38% of theory )N(6)-[D,L-2-hydroxy-2-(3-methoxy-phenyl)-ethyl]-2-chloroadenosine, which had a melting point of 89°–90° C.

EXAMPLE 40

N(6)-(6-methyl-heptyl-2)-2-chloroadenosine 4.5 g. triacetyl - 2,6-dichloro - 9-(β-D-ribofuranosyl)-purine, 2.0 g. 2-amino-6-methyl-heptane and 2.02 g. triethylamine were reacted in a manner analogous to that described in Example 1 and further worked up. The crude product was purified by preparative thin layer chromatography. The eluate from the silica gel was evaporated in a vacuum and the solid, foam-like residue triturated with ligroin. There were thusly obtained 1.4 g. (34% of theory) N(6)-(6-methyl-heptyl-2) - 2 - chloroadenosine having a melting point of 103–105° C.

EXAMPLE 41

N(6)-(D,L-1-phenoxy-propyl-2)-2-chloroadenosine 4.5 g. triacetyl - 2,6 - dichloro-9-(β-D-ribofuranosyl)-purine, 2.3 g. 1-phenoxy-2-amino-propane and 2.02 g. triethylamine were reacted according to the procedure described in Example 1 and then worked up. Purification was carried out by preparative thin layer chromatography. After evaporation of the eluate from the silica gel, there was obtained a solid, foam-like product which was triturated with ligroin. There were obtained 1.9 g. (43% of theory) N(6)-(D,L-1-phenoxy-propyl-2) - 2 - chloroadenosine which had a melting point of 98°–101° C.

EXAMPLE 42

N(6)-(D-(+)-1-phenyl-3-hydroxy-propyl-2)-2-chloroadenosine 4.5 g. triacetyl - 2,6 - dichloro-9-(β-D-ribofuranosyl)-purine, 2.3 g. D-(+)-1-phenyl-2-amino-propane-3-o1 and 2.02 g. triethylamine were reacted according to the method described in Example 1 and further worked up. Purification was carried out by preparative thin layer chromatography. The eluate from the silica gel was evaporated first in a vacuum and then at a high vacuum and the solid, foam-like residue which was obtained triturated with ligroin. There were thusly obtained 1.9 g. (43% of theory)

N(6)-(D-(+)-1-phenyl-3-hydroxy-propyl-2)-2 - chloroadenosine, which had a melting point of 102–104° C.

EXAMPLE 43

N(6)-(D-1-phenyl-propyl-2)-2-hydroxy-adenosine 5.0 g. 2-hydroxy-6-benzylmercapto-9-($\beta$-D-ribofuranosyl)-purine and 3.5 g. D-1-phenyl-2-amino-propane were under reflux for 4 hours in 30 ml. dioxan. After cooling, the solution was added dropwise to 200 ml. ether and the precipitate which formed filtered off with suction. The precipitated material was recrystallized from isopropanol. There were recovered 1.2 g. (23% of theory) N(6)-(D-1-phenyl-propyl-2)-2-hydroxy-adenosine, which had a melting point of 220–222° C.

EXAMPLE 44

N(6)-[2-(3-methoxy-phenyl)-ethyl]-2-chloroadenosine 4.5 g. triacetyl-2,6 - dichloro-9-($\beta$ - D - ribofuranosyl)-purine, 2.3 g. 2-(3-methoxy-phenyl)-ethylamine and 2.02 g. triethylamine were reacted in a manner analogous to that described in Example 1 and further worked up. The crude product was then purified by preparative thin layer chromatography. The pure product which was obtained was eluted from the silica gel with chloroform/methanol (1:1) and the eluate evaporated in a vacuum. The solid, foamy product was triturated with ligroin, filtered off with suction and dried. There were thusly obtained 2.4 g. (54% of theory) N(6)-[2-(3-methoxy-phenyl)-ethyl]-2-chloroadenosine, which had a melting point of 86–89° C.

EXAMPLE 45

N(6)-[D,L-1-(3,4-dimethoxy-phenyl)-propyl-2]-2-chloroadenosine 4.5 g. triacetyl - 2,6 - dichloro - 9 - ($\beta$-D-ribofuranosyl)-purine, 2.9 g. 1-(3,4 - dimethoxy - phenyl) - 2 - amino-propane and 2.02 g. triethylamine were reacted by a method analogous to that described in Example 1 and worked up. The crude product formed was purified by preparative thin layer chromatography. The eluate from the silica gel was evaporated in a vacuum. The solid, foamy residue was triturated with ligroin, filtered off with suction and dried. There was obtained 1.0 g. (21% of theory) N(6)-[D,L-1-(3,4-dimethoxy-phenyl)-propyl-2]-2-chloroadenosine which had a melting point of 104–106° C.

EXAMPLE 46

N(6)-[D,L-1-(m-cresoxy)-propyl-2]-2-chloroadenosine 4.5 g. triacetyl-2,6 - dichloro-9-($\beta$-D - ribofuranosyl)-purine, 2.5 g. 1-(m-cresoxy)-2-amino-propane and 2.02 g. triethylamine were reacted by a method analogous to that described in Example 1 and further worked up. The crude product was purified by preparative thin layer chromatography. The eluate from the silica gel was evaporated in a vacuum, the solid, foamy residue was triturated with ligroin, filtered off with suction and dried. There were thusly obtained 1.6 g. (35% of theory) N(6)-[D,L-1-(m-cresoxy)-propyl-2]-2-chloroadenosine, which had a melting point of 102–105° C.

EXAMPLE 47

N(6)-(L-1-phenoxy-propyl-2)-2-chloroadenosine 4.5 g. triacetyl-2,6-dichloro - 9 - ($\beta$ - D - ribofuranosyl) purine, 2.3 g. L-1-phenoxy-2-amino-propane and 2.02 g. triethylamine were reacted by a method analogous to that described in Example 1 and then worked up further. Purification was carried out by thin layer chromatography. The eluate from the silica gel was evaporated in a vacuum and the residue triturated with ligroin. There were obtained 1.6 g. (36.5% of theory) N(6) - (L - 1 - phenoxy-propyl-2)-2-chloroadenosine, having a melting point of 108–110° C.

EXAMPLE 48

N(6)-(2-methyl-benzyl)-2-hydroxy-adenosine 3.9 g. 2-hydroxy - 6 - benzylmercapto - 9 - ($\beta$ - D - ribofuranosyl)-purine and 1.8 g. 2-methyl-benzylamine were boiled under reflux for 2 hours in 50 ml. isopropanol. The reaction mixture was then evaporated in a vacuum and the residue recrystallized from isopropanol, with the addition of activated charcoal. There were obtained 1.3 g. (33% of theory) N(6)-(2-methyl-benzyl)-2-hydroxy-adenosine which had a melting point of 180–182° C. (decomp).

EXAMPLE 49

N(6)-(2-hydroxy-3-phenoxy-propyl)-2-hydroxy-adenosine 3.9 g. 2-hydroxy-6-benzylmercapto-9-($\beta$-D-ribofuranosyl)-purine and 2.6 g. 2-hydroxy-3-phenoxy-propylamine were boiled under reflux for 2 hours in 50 ml. isopropanol. The precipitate which separated out upon cooling the reaction mixture was filtered off with suction and recrystallized twice from isopropanol, with the addition of activated charcoal. There were thusly obtained 1.4 g. (32% of theory) N(6) - (2-hydroxy-3-phenoxy - propyl) - 2-hydroxy-adenosine, which had a melting point of 145–147° C.

EXAMPLE 50

N(6)-(2-hydroxy-3-$\alpha$-naphthaoxy-propyl)-2-hydroxy-adenosine 39 g. 2-hydroxy-6-benzylmercapto-9-($\beta$-D-ribofuranosyl)-purine and 3.3 g. 2-hydroxy-3-$\alpha$-naphthoxy-propylamine were boiled under reflux for 2 hours in 50 ml. isopropanol. The precipitate which separated out upon cooling the reaction mixture was filtered off with suction and recrystallized twice from isopropanol with the addition of activated charcoal. There was obtained 1.0 g. (21% of theory) N(6) - (2 - hydroxy-3-$\alpha$-naphthoxy-propyl)-2-hydroxy adenosine, which had a melting point of 152–154° C.

EXAMPLE 51

N(6)-(2-hydroxy-2-phenyl-ethyl)-2-hydroxy-adenosine 39 g. 2 - hydroxy - 6 - benzylmercapto - 9 - ($\beta$-D-ribofuranosyl)-purine and 2.1 g. 2-hydroxy-2-phenyl-ethylamine were boiled under reflux for 3 hours with 50 ml. isopropanol. The precipitate which was formed was filtered off with suction and recrystallized from isopropanol, with the addition of water. There were thusly obtained 1.5 g. (37% of theory) N(6)-(2-hydroxy-2-phenyl-ethyl)-2-hydroxy-adenosine, which had a melting point of 217–219° C.

EXAMPLE 52

N(6)-(2-hydroxy-3-m-cresoxy-propyl)-2-hydroxy-adenosine 3.9 g. 2-hydroxy - 6 - benzylmercapto - 9 - ($\beta$ - D - ribofuranosyl) - purine and 2.7 g. 2 - hydroxy-3-m-cresoxy-propylamine were boiled under reflux for 3 hours in 50 ml. isopropanol. The precipitate which was obtained upon cooling the reaction mixture was filtered off with suction and recrystallized twice from isopropanol. There were thusly obtained 1.8 g. (40% of theory) N(6)-(2-hydroxy-3-m-cresoxy-propyl)-2-hydroxy-adenosine, which had a melting point of 146–149° C.

EXAMPLE 53

N(6)-(3-hydroxy-benzyl)-2-chloroadenosine 4.5 g. triacetyl-2,6-dichloro-9-($\beta$-D-ribofuranosyl)-purine, 1.9 g. 3-hydroxy-benzylamine and 2.02 g. triethylamine were reacted by the procedure described in Example 1 and further worked up. The crude product was recrystallized from acetonitrile. There was obtained 1.0 g. (25% of theory) N(6)-(3-hydroxy-benzyl)-2-chloroadenosine, which had a melting point of 158–161° C.

EXAMPLE 54

N(6)-(2-methoxy-benzyl)-2-hydroxy-adenosine 5.0 g. crude N(6)-(2-methoxy-benzyl)-2-amino-adenosine were dissolved in 50 ml. glacial acetic acid. A solution of 5.3 g. sodium nitrile in 10 ml. water was added thereto, with ice cooling. The resulting reaction mixture was allowed to stand overnight at ambient temperature. It was then evaporated in a vacuum and the residue partitioned between chloroform and water. The chloroform phase was dried and evaporated in a vacuum and the residue was recrystallized twice from n-propanol, with the addition of activated charcoal. There were obtained 2.05 g. (34% of theory) N(6)-(2-methoxy-benzyl)-2-hydroxy-adenosine having a melting point of 150–152° C.

The N(6)-(2-methoxy-benzyl) - 2 - amino-adenosine which was used as starting material was prepared in the following manner:

5.3 g. 2-amino-6-bromo-9-(β-D-ribofuranosyl)-purine, 4.6 g. 2-methoxy-benzylamine and 3.0 g. triethylamine were boiled under reflux for 2 hours in 50 ml. isopropanol. The reaction mixture was thereafter evaporated in a vacuum, the residue taken up with chloroform and washed twice with water. The recovered chloroform phase was dried and evaporated. The residue was further worked up without further purification.

EXAMPLE 55

N(6)-benzyl-2-hydroxy-adenosine

This example illustrates a variation of the method described in Example 18.

3.7 g. N(6)-benzyl-2-amino-adenosine were dissolved in 25 ml. glacial acetic acid and mixed, while cooling with ice, with a solution of 3.5 g. sodium nitrite in 5 ml. water. Following standing overnight at ambient temperature, the reaction mixture was evaporated in a vacuum and the residue taken up with chloroform and water. The chloroform phase was dried, evaporated in a vacuum and the residue recrystallized from isopropanol, with the addition of activated charcoal. There were obtained 1.25 g. (33% of theory) N(6)-benzyl - 2 - hydroxy-adenosine, which had a melting point of 159–161° C.

The N(6) - benzyl-2-amino-adenosine used as starting material was prepared according to the following method:

5.0 g. (14.4 mmol) 2-amino-6-bromonebularine were boiled under reflux for 3 hours with 1.71 g. (15.85 mmol) benzylamine and 2.92 g. (28.8 mmol) triethylamine in 50 ml. isopropanol. After cooling the reaction mixture, the precipitated triethylamine hydrobromide which formed was filtered off with suction, thereafter thoroughly washed with isopropanol and the filtrate evaporated in a vacuum. The oily residue was digested twice with 50 ml. amounts of chloroform. Insoluble material was filtered off with suction and washed with chloroform. For purification a solution of the substance in 50 ml. dimethyl formamide was added dropwise, with thorough stirring, to 500 ml. ether. The precipitate which was obtained was filtered off with suction, thoroughly washed with ether and dried. There were thusly obtained 1.5 g. (29% of theory) N(6)-benzyl-2-amino-adenosine, which had a melting point of 92° C. (decomp.).

(The symbols "L" and "D" used in the preceding examples are intended to indicate the laevo- and dextro-rotatory isomers, respectively, without intending to give the absolute configuration of the compounds in question.)

In order to establish the effectiveness of the compounds in accordance with the invention as therapeutic agents exerting an effect on the cardiac and circulatory systems, the applicants carried out a series of tests, the details and significance of which are set out hereinafter.

Adenosine on intravenous administration in mammals and humans produces a vaso-dilatation. In particular this effect is noticeable in the coronary vascular system wherein a marked increase in blood circulation results from the vaso-dilatation produced by administration of adenosine (Berne, Blackmon and Gardner, J. Clin, Invest. 36, 1101 [1957]). However, due to the rapid deamination of adenosine, this effect is only transient. The derivatives of adenosine in accordance with the invention have been found to exert a marked coronoary vaso-dialating effect of high specificity but in contrast to adenosine, the effect is a prolonged one. In order to compare the effectiveness of the novel adenosine derivatives, on the coronary blood circulation, the applicants have selected N(6)-methyl adenosine which has been described in the literature (Bredereck, Haas u. Martini, Chem. Ber. 81, 307 [1948]) as the comparison compound.

An increased blood circulation in the coronary system, provided that there are no significant changes in the myocardial oxygen consumption, results in a reciprocal decrease of the coronary arteriovenous oxygen difference. This decrease in extraction of oxygen from the blood leads to an additional supply of oxygen and namely, that an improvement in the oxygen supply to the myocardium which is the ultimate aim sought to be achieved with all coronary dilating agents.

For the purpose of obtaining an exact basis for evaluating the results of the procedures involved, the decrease in coronary arteriovenous oxygen difference (at the time of the maximum effect) has been reported in volume percent in the table as compared to the starting value. The greater the value reported the more significant was the coronary oxygen supply increase.

The procedures were carried out using 34 alert unanesthetized dogs, each weighing between 12 and 16 kg. The procedure of Rayford, Huvos and Gregg, Proc. Soc. exp. Biol. Med. 113 876 [1963] were followed, catheters having been implanted surgically into the Sinus coronarius, the aorta and the vena cava of the animals. It was thus made possible to photometrically determine the coronary arteriovenous saturation difference (Brinkman, Arch. Chir. Neerl. 1, 177 [1949]) and from the actual hemoglobin values obtained to convert the values into the corresponding volume percents. The compounds were administered intravenously in the amounts indicated in 1 ml. of a 5 percent Lutrol-9-solution (liquid polyethylene oxide, molecular weight about 400, BASF-Ludwigshafen) in 5.5 percent aqueous glucose.

The following compounds were employed in the experimental procedures:

A—N(6)-methyl-adenosine
B—N(6)-(benzyl)-2-hydroxy-adenosine
C—N(6)-(methyl)-2-hydroxy-adenosine
D—N(6)-(β-phenylethyl)-2-hydroxy-adenosine
E—N(6)-(D,L-1-phenyl-propyl-2)-2-chloroadenosine
F—N(6)-(D-1-phenyl-propyl-2)-2-chloroadenosine
G—N(6)-(m-chlorobenzyl)-2-chloroadenosine
H—N(6)-(o-chlorobenzyl)-2-chloroadenosine
I—N(6)-(p-chlorobenzyl)-2-chloroadenosine
J—N(6)-(p-methoxybenzyl)-2-hydroxy-adenosine
K—N(6)-(allyl)-2-hydroxy-adenosine
L—N(6)-(propyl)-2-hydroxy-adenosine
M—N(6)-(m-chlorobenzyl)-2-hydroxy-adenosine
N—N(6)-(p-chlorobenzyl)-2-hydroxy-adenosine
O—N(6)-(isobutyl)-2-hydroxy-adenosine
P—N(6)-(trans-2-phenylcyclopropyl)-2-hydroxy-adenosine
Q—N(6)-(D-1-phenylpropyl-2)-2-hydroxy-adenosine
R—N(6)-(trans-2-phenylcyclopropyl)-2-chloroadenosine
S—N(6)-(α-phenylethyl)-2-chloroadenosine
T—N(6)-(β-phenylethyl)-2-chloroadenosine
U—N(6)-(isobutyl)-2-chloroadenosine
V—N(6)-(propyl)-2-chloroadenosine
W—N(6)-(o-chlorobenzyl)-2-hydroxy-adenosine
X—N(6)-(L-threo-1-hydroxy-1-phenylpropyl-2)-2-chloroadenosine
Y—N(6)-(L-erythro-1-hydroxy-1-phenylpropyl-2)-2-chloroadenosine
Z—N(6)-(allyl)-2-chloroadenosine AA—N(6)-(isopropyl)-2-chloroadenosine
BB—N(6)-(2-phenyl-cyclophentyl)-2-chloroadenosine
CC—N(6)-(2-methoxybenzyl)-2-chloroadenosine
DD—N(6)-(2-phenyl-cyclohexyl)-2-chloroadenosine
EE—N(6)-(2-butyl)-2-chloroadenosine
FF—N(6)-(3-α-naphthoxy-2-hydroxypropyl)-2-chloroadenosine
GG—N(6)-(L-(+)-threo-1-phenyl-1,3-dihydroxypropyl-2)-2-chloroadenosine
HH—N(6)-(L-1-phenylpropyl-2)-2-hydroxy-adenosine
II—N(6)-(L-1-phenylpropyl-2)-2-choloradenosine
JJ—N(6)-(2-methylbenzyl)-2-chloroadenosine
KK—N(6)-(3,5-dimethoxybenzyl)-2-chloroadenosine
LL—N(6)-(2-phenoxy-cyclopropyl)-2-chloroadenosine
MM—N(6)-[D,L-2-hydroxy-2-(3-methoxyphenyl)-ethyl]-2-chloroadenosine
NN—N(6)-(D,L-1-phenoxy-propyl-2)-2-chloroadenosine
OO—N(6)-(D-(+)-1-phenyl-3-hydroxypropyl-2)-2-chloroadenosine
PP—N(6)-[D,L-1-(3,4-dimethoxyphenyl)-propyl-2]-2-chloroadenosine
QQ—N(6)-[D,L-1-(m-cresoxy)-propyl-2]-2-chloroadenosine
RR—N(6)-(L-1-phenoxy-propyl-2)-2-chloroadenosine The following results of the experimental procedures are set out in the following table.

TABLE 1

Improvement in the coronary $O_2$ supply measured on the A.V. $DO_2$ difference

| Compound: | Doses, mg./kg. I.V. | Decrease in the coronary $O_2$ depletion in vol. percent as compared to the controls at maximum effectiveness |
|---|---|---|
| A | 0.4 | [1] ±0.0 |
|   | 2.0 | [1] ±0.0 |
| B | 0.6 | 6.0 |
| C | 0.4 | 2.0 |
| D | 0.4 | 7.9 |
| E | 0.2 | 2.5 |
| F | 0.2 | 1.3 |
| G | 0.2 | 1.2 |
| H | 0.4 | 8.3 |
| I | 0.2 | 1.0 |
| J | 0.2 | 1.0 |
| K | 0.2 | 2.0 |
| L | 0.4 | 8.7 |
| M | 0.2 | 2.5 |
| N | 0.4 | 2.6 |
| O | 0.4 | 3.7 |
| P | 0.2 | 2.2 |
| Q | 0.4 | 1.9 |
| R | 0.4 | 3.9 |
| S | 0.2 | 1.9 |
| T | 0.2 | 6.3 |
| U | 0.2 | 4.6 |
| V | 0.2 | 4.3 |
| W | 0.2 | 3.8 |
| X | 0.2 | 5.4 |
| Y | 0.4 | 1.5 |
| Z | 0.2 | 6.8 |
| AA | 0.2 | 4.7 |
| BB | 0.2 | 8.5 |
| CC | 0.2 | 5.1 |
| DD | 0.4 | 4.1 |
| EE | 0.4 | 8.0 |
| FF | 0.4 | 1.0 |
| GG | 0.2 | 1.0 |
| HH | 0.4 | 7.3 |
| II | 0.2 | 7.8 |
| JJ | 0.2 | 5.6 |
| KK | 0.4 | 6.7 |
| LL | 0.4 | 3.0 |
| MM | 0.2 | 2.0 |
| NN | 0.2 | 2.4 |
| OO | 0.4 | 2.5 |
| PP | 0.4 | 5.7 |
| QQ | 0.2 | 1.0 |
| RR | 0.4 | 1.4 |

[1] Without effect.

From the table, it can be seen that the compounds in accordance with the invention constitute highly valuable therapeutic agents having marked coronary dilating properties in contrast to the known compound which is substantially ineffective in a dosage range of 0.4 to 2.0 mg./kg.

As previously indicated, the adenosine derivatives of this invention are readily adapted to therapeutic use as cardio and circulatory agents. The toxicity of the compounds of the invention has been found to be quite low or substantially nonexistent when they are administered in amounts that are sufficient to achieve the desired therapeutic effects. Moreover, no other pharmacological side effects have been observed to occur as a result of their administration.

In accordance with the method of treatment of the present invention, the compounds can be given via the oral route. However, the compounds can also be administered as parenterals in the form of their solutions or suspensions. The compounds can be administered either alone and/or preferably in combination with a pharmaceutically acceptable carrier, and such administration can be carried out in both single and multiple dosages. More particularly, the compounds of this invention can be administered in a wide variety of different dosage forms wherein they are combined with various pharmaceutically acceptable inert carriers in the form of tablets, capsules, dragees, powders, aqueous suspensions, solutions, and the like. Such carriers include solid diluents or fillers, liquid aqueous media and various nontoxic organic solvents, etc. In general, the therapeutically effective compounds are present in such dosage forms at concentration levels ranging from about 0.01 to about 90% by weight of the total composition, i.e., in amounts which are sufficient to provide the desired unit dosage.

In dosage unit form, the compounds as set out herein are used in amounts of from 0.1–50 mg., preferably 0.5–10 mg. active ingredient per dosage unit. Preferably, the compositions are compounded so that for parenteral administration, 0.5–5 mg. of active compound/dosage unit is present and for oral administration 2–10 mg. of compound/dosage unit.

What is claimed is:
1. An adenosine derivative having the formula:

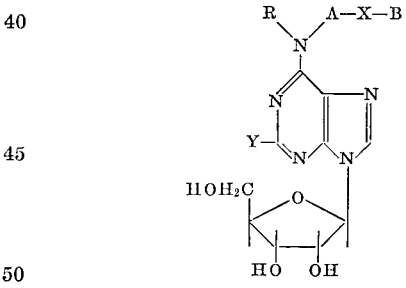

wherein Y is a member selected from the group consisting of halogen and hydroxyl; R is a member selected from the group consisting of hydrogen and lower alkyl; A is a member selected from the group consisting of lower alkyl, lower alkenyl, lower hydroxyalkyl, and cycloalkyl of no more than 6 carbon atoms; X is a valency bond or oxygen; B is a member selected from the group consisting of hydrogen, phenyl, naphthyl, halogen-substituted phenyl, hydroxyl-substituted phenyl, lower alkyl-substituted phenyl and lower alkoxy-substituted phenyl.

2. An adenosine derivative according to claim 1 designated N(6)-(propyl)-2-hydroxy-adenosine.

3. An adenosine derivative according to claim 1 designated N(6)-(β-phenylethyl)-2-chloroadenosine.

4. An adenosine derivative according to claim 1 designated N(6) - (L - threo - 1 - hydroxy-1-phenylpropyl-2)-2-chloroadenosine.

5. An adenosine derivative according to claim 1 designated N(6)-(allyl)-2-chloroadenosine.

6. An adenosine derivative according to claim 1 designated N(6)-(2-phenyl-cyclopentyl)-2-chloroadenosine.

7. An adenosine derivative according to claim 1 designated N(6)-(2-methoxybenzyl)-2-chloroadenosine.

8. An adenosine derivative according to claim 1 designated N(6)-(L-1-phenyl-propyl-2)-2-chloroadenosine.

9. An adenosine derivative according to claim 1 designated N(6)-(2-methylbenzyl)-2-chloroadenosine.

References Cited

UNITED STATES PATENTS

| 3,014,900 | 12/1961 | Schroeder | 260—211.5 |
| 3,208,997 | 9/1965 | Iwai et al. | 260—211.5 |
| 3,225,029 | 12/1965 | Yamaoka | 260—211.5 |
| 3,380,996 | 4/1968 | Honjo et al. | 260—211.5 |

LEWIS GOTTS, Primary Examiner

J. R. BROWN, Assistant Examiner

U.S. Cl. X.R.

424—180

PO-1050
(5/69)

UNITED STATES PATENT OFFICE
CERTIFICATE OF CORRECTION

Patent No. 3,551,409          Dated December 29, 1970

Inventor(s) 1) Wolfgang Kampe   2) Max Thiel   3) Kurt Stach
       4) Wolfgang Schaumann   5) Karl Dietmann It is certified that error appears in the above-identified patent and that said Letters Patent are hereby corrected as shown below:

Column 1, line 66

"of" should read --or--

Column 8, line 11

"procdure" should read --procedure--

Column 8, line 24

"triacetyl 12,6 . . ." should read --triacetyl-2,6 . .

Column 10, line 29

"purifide" should read --purifidd--

Column 12, line 30

"39" should read --3.9--

Column 12, line 43

"39" should read --3.9--

Column 14, line 5

"dialating" should read --dilating--

Column 15, line 2

"cyclophentyl" should read --cyclopentyl--

Signed and sealed this 4th day of May 1971.

(SEAL)
Attest:

EDWARD M. FLETCHER, JR.                   WILLIAM E. SCHUYLER, JR